Figure 7:
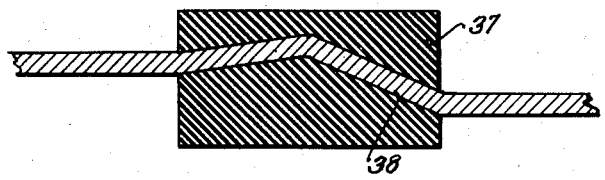

Dec. 15, 1942.                R. E. FEARON                2,305,150
                           ELECTRICAL TERMINAL
                         Filed July 16, 1940           2 Sheets-Sheet 1
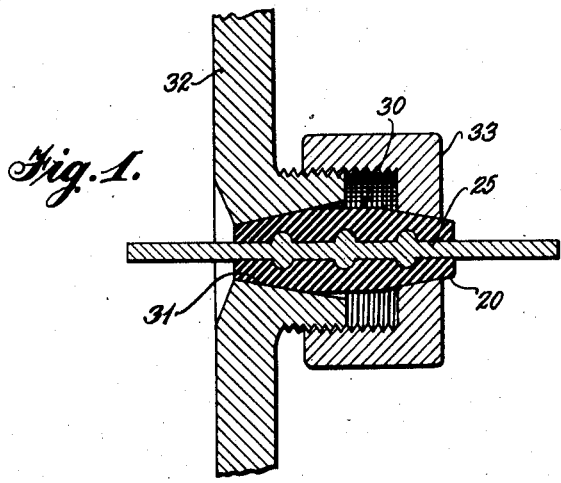
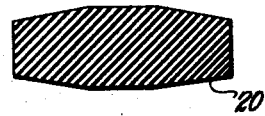
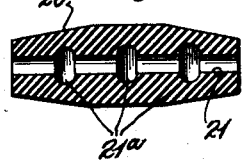
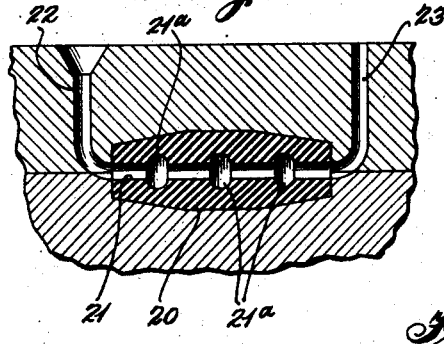
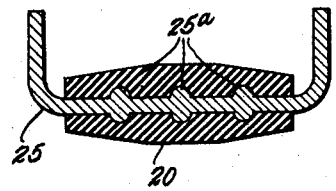
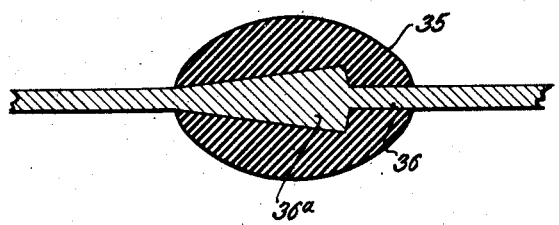
Inventor
Robert E. Fearon
By Stevens and Davis
Attorneys Dec. 15, 1942.   R. E. FEARON   2,305,150
ELECTRICAL TERMINAL
Filed July 16, 1940   2 Sheets-Sheet 2

Inventor
Robert E. Fearon
By Stevens and Davis
Attorneys

Patented Dec. 15, 1942

2,305,150

UNITED STATES PATENT OFFICE 2,305,150

ELECTRICAL TERMINAL

Robert Earl Fearon, Tulsa, Okla., assignor to Well Surveys, Incorporated, Tulsa, Okla., a corporation of Delaware Application July 16, 1940, Serial No. 345,783

4 Claims. (Cl. 174—167)

This invention relates generally to electrical terminal assemblies, and especially is concerned with a novel insulated electrical terminal and to a process for manufacturing the same.

In the manufacture of certain types of electrical apparatus, particularly highly evacuated ionization chambers for detecting high frequency radiation, a need has long been felt for a method of mounting terminals in the apparatus in a manner which would resist gas leakage while providing adequate electrical insulation. At least most types of mountings which have heretofore been employed have been defective in this particular, due at least in a large measure to difficulties involved in securing proper union between electrical insulators and conductors. For example, it has been customary in many instances to use wire electrodes of platinum or invar, mounted in glass holders which in turn were held in appropriate supporting means in the apparatus. Invar and platinum were selected for this purpose because the coefficients of thermal expansion of these materials closely approach the coefficients of expansion of many common types of glasses, which accordingly permitted reasonably satisfactory sealing of the conductor within the glass by solidifying fused glass directly thereon. Terminals of this type, however, have been found unsatisfactory for use in highly evacuated apparatus, particularly those types of apparatus in which residual gas within the evacuated chamber comprises hydrogen, helium, or the like, capable of readily penetrating through minute openings in otherwise apparently impermeable materials. Experience indicated that the leakage, to a major degree, occurred at the juncture of the glass and the electrical conductor through the passage created by differential contraction of the materials subsequent to manufacture, and that leakage appreciably increased as the temperature of the assembly was raised as under these circumstances the effective area of the passage was materially increased.

It is an achieved object of the present invention to provide a type of electrical terminal and a process of manufacturing the same whereby a union, gas-tight even at elevated temperatures and under superatmospheric pressures, can be provided between an electrically insulative material and an electrical conductor.

Regarded in certain of its broader aspects the novel insulated electrical terminal according to the present invention comprises electrically insulative material having integrally cast therein an electrically conductive body of irregular outline under conditions such that the block and body normally press against each other. The process of manufacturing terminals of this character according to this invention comprises forming a channel of irregular outline in a block of electrically insulative material, at least largely filling the channel with fused electrically conductive material, and solidifying said electrically conductive material in situ to provide a continuous electrical conductor within the block, the coefficients of thermal expansion of the materials being related in a manner such that normally one of the materials presses against the other.

When selecting materials for practicing this invention, it is essential, as mentioned, that the coefficients of thermal expansion of the substances in each pair be related whereby in the finished product at normal temperatures and pressures, a substantial but not destructive pressure is exerted by one of the materials against the other minimizing spacing at the interface. In addition thereto, one of the materials must be more readily fusible than the other permitting the first to be cast-molded within the second. Other criteria to be considered, of course, include the relative electrical conductivity of the substances, this factor being determined in each instance by the circumstances under which the device is to be used, and the permeability of the substances to gases under conditions of use.

Among the common electrical insulators useful in the practice of this invention are synthetic resinous bodies, such as Bakelite-dilecto, Micarta 32x, ebonite, glazed porcelain, quartz (fused) and glasses of all kinds, to mention but a few materials representative of a general class. Almost any of the common metals and alloys thereof can be used as the electrically conductive medium in practicing this invention, due regard being accorded the criteria mentioned above in selecting the same, of course. For many purposes the readily fusible alloys such as Wood's metal, Lipowitz's alloy (the foregoing both melting below 100° C.); lead and alloys thereof, particularly those including antimony, tin, and/or bismuth; magnesium; zinc; tin; silver; and alloys thereof. Other materials, having the characteristics hereinabove mentioned suiting them to use in practicing this invention, will be apparent to those skilled in this art.

To facilitate a fuller and more complete understanding of the matter of the present invention, certain specific embodiments thereof, herein illustrated will be hereinafter described, but it is clearly to be understood that the examples are provided by way of explanation, not by way of limitation of the matter of this invention.

Referring then to the drawings:

Figure 1 is essentially a vertical sectional view of an insulated electrical terminal according to this invention, showing the same mounted in a conventional support;

Figures 2 to 5 inclusive are essentially vertical sectional views, illustrating steps in the manufacture of the insulated terminal illustrated in Figure 1; and Figures 6 to 11 inclusive are essentially vertical sectional views of modified forms of insulated electrical terminals according to this invention.

In describing the illustrated embodiments of this invention the process of manufacturing insulated electrical terminals will first be described and thereafter the particular terminals illustrated.

Referring now particularly to Figures 2 to 5 inclusive, it will be observed that a block of electrically insulative material designated by the reference character 20 is provided as an initial step in manufacture with a continuous channel 21 having irregular sections 21a extending through the block. The block so prepared is mounted in an appropriate support providing a funneled pour passage 22 and a vent passage 23, each passage extending an appreciable distance from the corresponding end of the channel 21 with which each communicates as illustrated in Figure 4. A further step in manufacture comprises at least largely filtering the passages and channel with fused electrically conductive material and thereafter permitting the fused material to solidify whereby a solid electrical conductor 25 is provided within the block extending therefrom substantially as shown in Figure 5. It is especially to be noted that the irregular portions 21a of the channel 21 cause corresponding irregularities in outline 25a of the conductor cast therein, which serve to facilitate interengagement of the conductor with the block thus resisting relative movement which under certain circumstances might permit gas leakage when the terminal is in use.

A representative type of mounting for holding the hereinabove described terminal is illustrated in Figure 1 wherein the terminal, generally designated by the reference character 30, is shown received in an inwardly tapering sleeve 31 formed integrally on a wall 32, being held in position therein by a cap 33, received upon the threaded exterior of the sleeve essentially as illustrated. It is to be understood that the cap permits pressing of the terminal within the sleeve in a manner such that a substantially gas-tight seal is effected.

The above described terminal can be manufactured utilizing either (a) a combination of insulator material and conductor wherein the thermal expansion coefficient of the former exceeds that the latter, or (b) a combination wherein the thermal expansion coefficient of the conductor exceeds that of the insulator. In the first instance (a), the insulator contracts more than does the conductor during cooling after the casting operation, hence, presses against the conductor over the entire surface of the irregular channel; in the second instance (b), the conductor contracts more than does the insulator thereby causing the irregular portions of the conductor to approach each other with resultant gripping of the insulator by the conductor.

Illustrative of combinations of specific electrically insulative and conductive materials useful in manufacturing the terminals according to the present invention are the following, which for convenience are classified in two groups: the first when the thermal expansion coefficient of the insulator exceeds that of the conductor, and the second wherein the conductor coefficient exceeds the insulator coefficient.

Group 1:
1. Bakelite dielectro and lead (85%) antimony (15%) alloy;
2. Micarta 32x and lead (67%) tin (33%) alloy;
3. Ebonite and Wood's metal;
4. Micarta 32x and Lipowitz's alloy; and
5. Micarta 32x and lead.

Group 2:
1. Fused quartz and Invar;
2. Hard glass and type metal;
3. Glazed porcelain and Wood's metal; and
4. Quartz and lead.

A modified form of terminal according to the present invention is illustrated in Figure 6 wherein the insulator block is designated by the reference character 35 and the conductor by 36. It will be observed that the conductor includes an intermediate tapering flared portion 36a, resulting from the provision of a similarly shaped channel in the block wherein the conductor was cast, which precludes withdrawal of the conductor from the block in either direction. This type of terminal can be made satisfactorily from any of the groups of materials set forth in group 1 above.

Figure 7 illustrates an embodiment of the invention wherein intersecting angularly related passages are formed in the block 37 wherein the conductor 38 is cast. The materials in group 1 above may be used advantageously in manufacturing this type of terminal.

Figure 8:
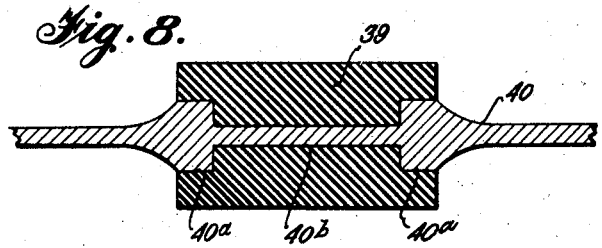

The terminal shown in Figure 8, which can be fabricated from materials in either group 1 or group 2 above, comprises, it will be observed, an insulator block 39 having a conductor 40 cast therein including relatively massive end portions 40a linked by a diminished intermediate section 40b. This embodiment of the present invention is of especial importance in view of its extreme structural simplicity, particularly the absence of undercutting in the insulator block.

Figure 9:
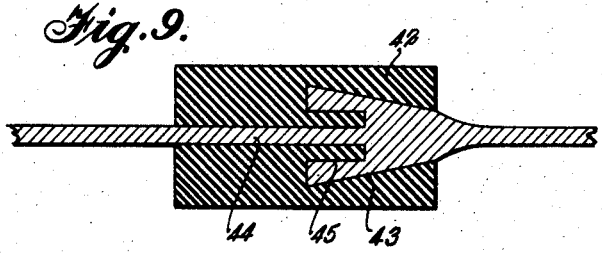

The modification illustrated in Figure 9 utilizes undercutting of the insulator block 42 along the surface indicated by the reference character 43 whereby the conductor 44 is retained within the block. It is to be observed that an integral sleeve 45 is provided extending within the body of the conductor, accordingly as will be obvious from examination of the drawings, this type of terminal can be fabricated from either the materials in group 1 above or from the materials in group 2 since in either instance pressing engagement of the insulator and conductor will result.

Figure 10:
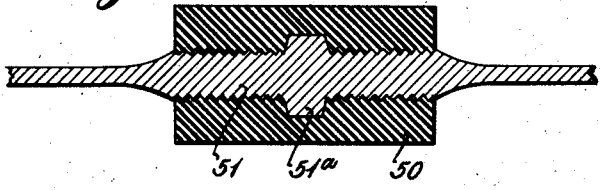

A tapped internally flared molding channel is formed in the insulator block 50 of the terminal illustrated in Figure 10, whereby, due to the centrally located projection 51a, the conductor 51 cast therein is secured against relative movement. This type of terminal can be fabricated from combinations of materials selected from either of the groups 1 or 2 above.

Figure 11:
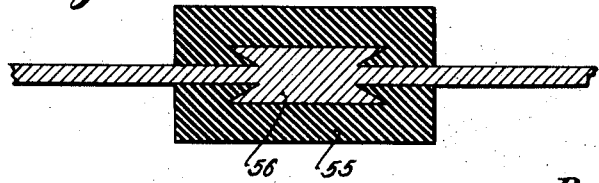

In Figure 11 an embodiment of this invention is illustrated wherein the insulator block 55 is shaped with confronting undercut formations provided in the passage extending therethrough whereby the conductor 56 cast therein presses against or is pressed by a series of surfaces resulting in a gas-tight and structurally strong engagement. This type of terminal, like the terminals illustrated in Figures 5, 8, 9 and 10 can be fabricated from combinations of materials selected from either of the groups 1 or 2 above.

Having thus described the present invention, what it is desired to secure by Letters Patent is:

1. An electrical lead-in assembly comprising a body formed of material having a substantially negligible coefficient of thermal expansion and, integrally cast therein and extending therethrough, a continuous electrical conductor of irregular longitudinal cross-sectional outline, said conductor having an appreciable thermal expansion coefficient.

2. An electrical lead-in assembly comprising a body of quartz and, integrally cast therein and extending therethrough, a continuous electrically conductive member of irregular longitudinal cross-sectional outline, said member being formed of material having an appreciable coefficient of thermal expansion.

3. An electrical lead-in assembly comprising a fused quartz insulative body and, integrally cast therein and extending therethrough, an irregularly shaped electrical conductor formed of lead.

4. An electrical lead-in assembly comprising a body of quartz and, integrally cast therein and extending therethrough, a continuous member formed of lead, said member being provided with radially extending annular shoulders integrally formed on said member and shaped along the longitudinal axis thereof.

ROBERT EARL FEARON.

CERTIFICATE OF CORRECTION.

Patent No. 2,305,150.  December 15, 1942.

ROBERT EARL FEARON.

It is hereby certified that error appears in the printed specification of the above numbered patent requiring correction as follows: Page 2, first column, line 64, after "that" insert --of--; page 3, second column, line 16, claim 4, for "shaped" read --spaced--; and that the said Letters Patent should be read with this correction therein that the same may conform to the record of the case in the Patent Office.

Signed and sealed this 2nd day of February, A. D. 1943.

Henry Van Arsdale,
Acting Commissioner of Patents.

(Seal)